Patented Dec. 9, 1930

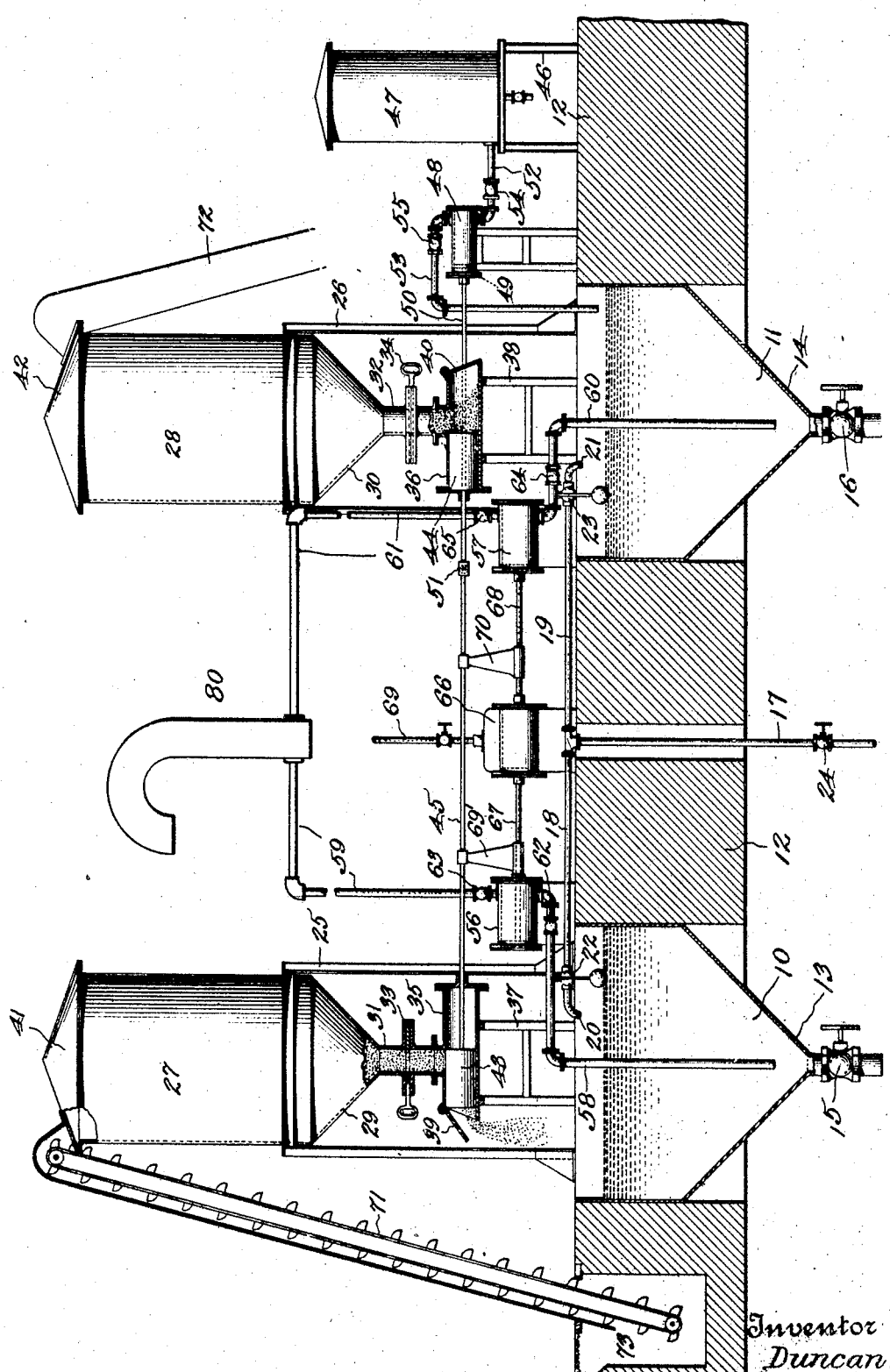

1,784,680

UNITED STATES PATENT OFFICE

DUNCAN W. PATTERSON, OF DOUGLASTON, NEW YORK, ASSIGNOR, BY MESNE ASSIGNMENTS, TO AMERICAN LA FRANCE AND FOAMITE CORPORATION, A CORPORATION OF NEW YORK

METHOD OF AND SYSTEM FOR GENERATING FIRE-EXTINGUISHING FOAM

Application filed September 20, 1921. Serial No. 501,945.

The invention relates to foam-type fire extinguishing systems and methods, and its object is the production of foam continuously and in proportion to the demand, from a storage supply of reacting chemicals and foaming agent or stabilizer, and water, thereby avoiding the need for preliminary preparation and storage of large quantities of foam-making solutions, as heretofore the general and necessary practice.

The figure is an elevational view of my system with parts shown in section and other parts broken away.

Referring to the drawings, I provide two tanks or chambers 10 and 11 having suitable supporting means 12, the tanks or chambers being arranged for the passage of water therethrough. Although the tanks 10 and 11 may be of any desired construction, I prefer to provide them with sloping bottoms 13 and 14 respectively. The tanks 10 and 11 are provided with drain valves shown at 15 and 16 respectively, whereby they may be washed out after use. The water enters from the supply line 17 provided with the branch pipes 18 and 19, which terminate in outlets 20 and 21 discharging into the tanks 10 and 11, float valves 22 and 23 being provided to control the water inflow and the supply line being provided with a shut-off valve 24 to close the system down. As will be apparent the float valves operate to maintain the water inflow equal to the composite outflow. Although the outlets 20 and 21 may be arranged in any desired manner, it is preferred to arrange these outlets so as to provide a swirling motion in the jet or stream of water delivered in order to effect a more rapid mixing of the chemicals intended to be fed into the said tanks, and to this end the outlets 20 and 21 may be arranged tangential to the water level in the said tanks.

Mounted above the tanks 10 and 11 and mounted on the frame structures 25 and 26 supported on the foundation 12, I provide the containers or bins 27 and 28 respectively, the said containers or bins being intended for the reception and storing of concentrated acid and basic chemicals. The chemicals I prefer to use are in the form of salts. To this end the container or bin 27 is filled with aluminum sulphate, preferably in powdered or finely ground form. Similarly, container or bin 28 is provided with the dry sodium bicarbonate salt. The containers or bins 27 and 28 may be of any desired construction, and provided with sloping bottoms 29 and 30 terminating in feeding throats 31 and 32, the throats 31 and 32 being provided with sliding gates 33 and 34, these gates being intended to be adjusted for the purpose of shutting off the feed of the powdered chemicals from the bins. Connected to the feed throats 31 and 32 and communicating therewith, I provide the feed cylinders 35 and 36, the said feed cylinders being supported on structures 37 and 38 respectively, the feed cylinders 35 and 36 being provided with pivoted gates 39 and 40 respectively. Normally, each container or bin is closed by the provision of the tops or roofs 41 and 42 respectively and by the provision of the pivoted gates 39 and 40, this having been found to be desirable for the purpose of maintaining the chemicals in dry condition. In the cylinders 35 and 36 are slidably and loosely mounted feeding plungers or pushers 43 and 44, the said plungers being connected together to operate in unison, as by means of the plunger rod 45. It will be apparent from this construction that in reciprocating the plunger rod 45 in time of fire to effect alternate reciprocation of the plungers or pushers 43 and 44, predetermined amounts of the aluminum sulphate and the sodium bicarbonate salts will be fed from the feed cylinders 35 and 36 to the tanks 10 and 11, reciprocating motion of the plungers 43 and 44 also effecting the opening and closing of the pivoted gates 39 and 40. The plungers 43 and 44 are constructed of a predetermined size and these plungers cooperate with the predetermined adjustments of the sliding gates 33 and 34 to eject or feed the proper amount of each chemical at each stroke of the plunger into the tanks 10 and 11 consistent with the amount of water delivered to the tanks by means of the outlets 20 and 21 and consistent with the amount of solutions withdrawn from said tanks and delivered to the solution lines to be hereinafter referred to.

Located near the basic tank 11 and mounted on the framework 46 supported by the foundation 12, I provide a receptacle or tank 47 of relatively small capacity, the said receptacle or tank being intended for holding a concentrated foam producing substance which may be of the type disclosed in the patent to Walker, No. 1,161,190, dated November 23, 1915. The foam producing substance, contained in the receptacle or tank 47 is intended to be fed from the said tank in time of fire and into the basic tank 11. For the purpose of feeding or delivering it from the receptacle or tank 47 into the tank 11 I prefer to provide a pump 48, the pump being provided with the usual piston 49 and piston rod 50, the piston rod 50 being connected to the plunger rod 45 by means of a coupling 51, the pump piston being thus actuated with the reciprocation of the plunger rod 45 for the purpose of effecting a feed or discharge of the foam producing substance into the tank 11 concomitantly with the feeding of the basic salt through the feed cylinder 36. The cylinder of the pump 48 is connected to the tank 47 by means of piping 52 and to the discharge communication to the tank 11 namely piping 53, the piping 52 and 53 including the usual check valves 54 and 55 respectively. It will be apparent from the above construction that upon reciprocation of the plunger rod 45, the acid salt will be fed to the tank 10 and the basic salt and foaming substance or stabilizer will be fed to the tank 11. These chemicals are fed by dropping into the water and from points above the level of the water and the latter being open to atmosphere is at atmospheric pressure.

The solutions produced in the swirling water passing through the tanks 10 and 11 in time of fire may be withdrawn in any desired manner, as, for example, by gravity, when the said tanks are mounted at a desired elevation. The preferred construction, however, comprehends the withdrawal of the solutions from the tanks 10 and 11 by pumping the same from the said tanks for delivery at any desired remote point. To this end I provide pumps 56 and 57, the suction end of the pump 56 communicating with the solution or suction tank 10 by means of the piping 58 extending into the said tank 10 and terminating preferably adjacent the bottom thereof, the exhaust end of the pump 56 being connected to acid solution line 59. The suction or induction end of the pump 57 is, in turn, connected for communication with the basic suction tank 11 by means of the piping 60, the said piping 60 also extending into the tank 11 and terminating preferably adjacent the bottom thereof, the discharge end of the pump 57 being similarly connected to the basic solution line 61. The piping 58 and solution line 59 are provided with the usual check valves 62 and 63 respectively and the piping 60 and basic solution line 61 are, in turn, also provided with the usual check valves 64 and 65 respectively.

The pumps 56 and 57 are preferably operated in unison by means of preferably a steam engine 66, the piston rod of the said steam engine 66 being connected to the piston rods 67 and 68 of the pumps 56 and 57, these pumps being thus actuated in unison by means of the engine 66. The steam supply line for the engine 66 is designated at 69 in the drawings. In order to utilize the operation of the engine 66 for controlling or operating the entire plant, I preferably connect the feeding plunger rod 45 to the piston rods 67 and 68 for actuation therewith. To this end the plunger rod 45 may be connected, as by means of brackets 69' and 70, to the piston rods 67 and 68, as clearly indicated in the drawings.

For charging the containers or bins 27 and 28 either to fill the same with the chemicals during storage use or to supply added chemicals to the containers or bins in time of fire, I may provide the said bins with elevators 71 and 72 respectively, the said elevators feeding the chemicals to the containers or bins from a supply station such as 73.

The use and operation of my fire extinguishing system will, in the main, be apparent from the above detailed description thereof. In time of fire the steam engine 66 is set into operation, operation of the steam engine producing pumping activity of the pumps 56 and 57 and feeding activity of the plungers 43 and 44 and of the piston 49 for the feeding into the tank 10 of the acid salt and the feeding into the tank 11 of the basic salt and the foam producing substance, the salts and foam producing substance fed into the tanks being more or less dissolved in the water contained in said tanks, acid and basic chemical component solutions being effected in this manner. The operation of the pumps causes a withdrawal of the solutions from the tanks 10 and 11 and a delivery of the same into the solution lines 59 and 61, the solutions being separately conducted in these lines for intermixture at some remote point such as, for example, a mixing chamber 80 connected to an oil tank (not shown). With the withdrawal of the solutions from the tanks and the resulting lowering of the solution level in the said tanks, the float valves 22 and 23 are opened, a fresh supply of water being fed from the supply line 17 to the tanks 10 and 11 by way of the outlets 20 and 21 respectively, the delivery of the water supply, the feeding of the chemicals to the tanks and the pumping of the solutions from the tanks being arranged for cooperation to effect the production of uniformly dissolved solutions.

It will be apparent from the above detailed description of my system that I have provided a plant in which the acid and basic chemicals and the foam producing substance may be normally stored in concentrated form, permitting a plant of relatively small capacity and therefore of small installation cost, eliminating the necessity of special and costly equipment previously found necessary and eliminating the cost of maintenance or upkeep in prior systems incident to the necessity for keeping the solutions in proper condition available for use and in which the acid and basic chemicals and the foam producing substance are fed in an efficient manner for obtaining the chemical component solutions and moreover in which such solutions are brought into intermixing relationship for the production of a fire extinguishing foam, yielding a plant capable of simple operation not only, but in which the capacity of the plant as a fire extinguishing agency is practically unlimited.

It will also be understood that the operation of the ingredient feeding-mechanism above described accurately measures the ingredient materials as they are delivered into the respective tanks, maintaining substantially constant proportions to each other and constant joint proportions to the rate of passage of water through the apparatus, and further, that the proportion of the total ingredients to the water is such as essential to the production of foam that will float on burning oil, that is to say, the same as in the old style premade-solution type of system which the present system supplants as above stated, and in which each solution approximates saturation. The dry chemical powders are dropped into the water passing through the tanks, wherein they are respectively mixed with the water by the effect of the commotion caused by the water inflow from supply cocks 20 and 21. This gives a partial or preliminary mixing of each powder in its water stream. The suction pipes 58 and 60 draw off the mixture from the lower parts of the tanks, where the powder tends to gravitate and further mixing takes place in these pipes so that on arrival at the remote mixing device each solution is thoroughly homogeneous as to its chemical strength and therefore well adapted for conversion into usable foam. Such foam moreover is made continuously and directly, by feeding the solid chemicals to water streams, so that the need of large storage tanks for pre-mixed solutions, heretofore universally used and deemed essential no longer exists.

I am aware of many prior proposals to introduce reacting chemicals continuously to water flowing in a pipe or hose line merely for the purpose of charging the water with $CO_2$ gas. My new system broadly differs from all such prior and now obsolete systems, first, by the fact that three instead of only two ingredients are fed to the continuously flowing water, one of them being a foam stabilizer, second, by the fact that the proportions of all three are kept constant mutually and to the water rate and jointly large enough to make solutions which completely convert on being mixed, to make foam that will float on oil and thirdly, in its preferred form, that the two solutions, one containing the viscous third ingredient, are further mixed and homogenized by passage through separate conduits to the place where the foam is made and used, and it is intended that the claims be construed in the light of the broad invention except when they are otherwise expressly limited.

While I have shown my device in the preferred form, it will be obvious that many changes and modifications may be made in the structure disclosed without departing from the spirit of the invention, defined in the following claims.

I claim:

1. A continuous foam generating system comprising a source of water, two receptacles, means for conducting part of such supply to one receptacle and the rest of it to the other, acid and basic powder storage chambers respectively appurtenant to said receptacles, power means for continuously feeding said powders respectively and also a stabilizing material into said receptacles for mixture with the water therein, pumps for drawing off the contents of said receptacles at a predetermined relative rate and separate conduit means for conducting the same to a mixing device.

2. A continuous foam generating system comprising a source of water, two receptacles open to atmosphere, means for conducting part of the water supply to one receptacle and the rest to the other, storage chambers respectively appurtenant to said receptacles and containing respectively acid and basic powders, means for feeding powder from one chamber together with a foam-stabilizing material to one said receptacle, means for feeding powder from the other chamber to the other said receptacle, said means being correlated to maintain constant relative proportions between said feeds and the rate of water supply to said receptacles, and means for bringing together the acid and basic mixtures resulting from such feeds.

3. A system for continuously generating fire-extinguishing foam comprising a main water supply, two receptacles each open to atmosphere when in use and means for conducting part of said water supply to one receptacle and the rest to the other, in combination with means acting continuously and in constant ratio with respect to the rate of water supply for continuously introducing into the water stream in one receptacle a chemical powder and a foam-stabilizing material and into the other a reacting chemical powder, a mixing conduit, and means for separately conducting said streams from said receptacles to said mixing conduit.

4. The method of continuously producing and delivering foam capable of extinguishing fires, and of a desired consistency, which comprises establishing separately defined streams of water and effecting the flow of each stream from its source toward a point of discharge, effecting a substantially continuous delivery of a solid reagent into one stream from an exterior source, simultaneously effecting a substantially continuous delivery of another reagent into another of the streams from a separate exterior source, said last mentioned reagent being capable upon solution of reacting with a solution of the first mentioned reagent to produce a non-combustible gas, the said reagents being delivered into the respective streams in proportions substantially constant with respect to each other and to the rate of water supply, conducting the respective reagents after the introduction thereof into the water in streams toward the point of discharge, and directing the streams to cause an intermingling thereof in the presence of a stabilizer which has been incorporated in the water in advance of the point of intermingling, the delivery of the reagents into the respective streams being in amounts sufficient to render the solutions thereof of foam producing strength, the intermingling of the dissolved reagents in the presence of the stabilizer effecting reaction to thereby produce a stable gas-filled foam capable of floating on oil.

5. The method of continuously producing fire extinguishing foam which comprises, providing two separate streams of water each flowing from a source of supply toward a common point of discharge, substantially simultaneously and continuously introducing a solid reagent and a foam stabilizing material into one stream and another solid reagent into the other stream, said last mentioned reagent being capable upon solution of reacting with a solution of the first mentioned reagent to produce a non-combustible gas, said reagents being introduced to the respective streams from separate exterior sources in constant proportions with respect to each other and to the rate of water supply, separately conducting said streams from the places of reagent introduction to a remote place of use, and comingling the streams, the introduction of the reagents to the separate streams being in amounts sufficient to render the solutions thereof of foam producing strength, the comingling of the streams effecting a reaction to thereby produce a stable gas-filled foam capable of floating on oil.

6. The method of continuously producing fire extinguishing foam which comprises, providing two separate streams of water each flowing from a source of supply toward a common point of discharge, simultaneously and continuously positively propelling a solid reagent into one stream and another solid reagent into the other stream while introducing a foam stabilizing material into one of the streams, said last mentioned reagent being capable upon solution of reacting with a solution of the first mentioned reagent to produce a non-combustible gas, said reagents being introduced to the respective streams from separate exterior sources in constant proportions with respect to each other and to the rate of water supply, and directing said streams to cause a comingling thereof, the introduction of the reagents to the separate streams being in amounts sufficient to render the solutions thereof of foam producing strength, said comingling of the streams effecting a reaction to thereby produce a stable gas-filled foam capable of floating on oil.

7. The method of continuously producing and delivering foam capable of extinguishing fires and of a desired consistency which comprises flowing water from a source of supply toward a point of discharge, effecting a substantially continuous introduction of basic and acid reagents in powder form into the water from the exterior, said reagents being capable upon solution of reacting to produce a non-combustible gas, co-incidently and continuously introducing a film toughening agent to said water, maintaining the continuous introduction of the reagents into the water in proportions substantially constant with respect to each other and to the rate of water supply and conducting the respective reagents after the introduction thereof into the water to effect an intermingling thereof in the presence of the film toughening agent, the introduction of the reagents into the water being in amounts sufficient to render the solutions thereof of foam producing strength, the intermingling of the dissolved reagents in the presence of the stabilizer effecting reaction to thereby produce a stable gas filled foam capable of floating on oil.

8. The method of continuously producing and delivering foam capable of extinguishing fires and of a desired consistency which comprises flowing water from a source of supply toward a point of discharge, effecting a substantially continuous introduction of a basic reagent into the water from an exterior supply, effecting a substantially simultaneously continuous introduction of an acid reagent into the water from a separate exterior supply, said reagents being introduced to the water in powder form and being capable upon solution of reacting to produce a non-combustible gas, co-incidently and continuously introducing a film toughening agent to said water, maintaining the continuous introduction of the reagents into the water in proportions substantially constant with respect to each other and to the rate of water supply, and conducting the respective reagents after the introduction thereof into the water to effect an intermingling thereof in the presence of the film toughening agent, the introduction of the reagents into the water being in amounts sufficient to render the solutions thereof of foam producing strength, the intermingling of the dissolved reagents in the presence of the stabilizer effecting reaction to thereby produce a stable gas filled foam capable of floating on oil.

Signed at New York, in the county of New York and State of New York, this sixteenth day of September, A. D. 1921.

DUNCAN W. PATTERSON.